Jan. 23, 1951  J. B. LOBB  2,539,025
CHILD'S INSTRUCTIONAL OR AMUSEMENT DEVICE
Filed Aug. 1, 1947  2 Sheets-Sheet 1
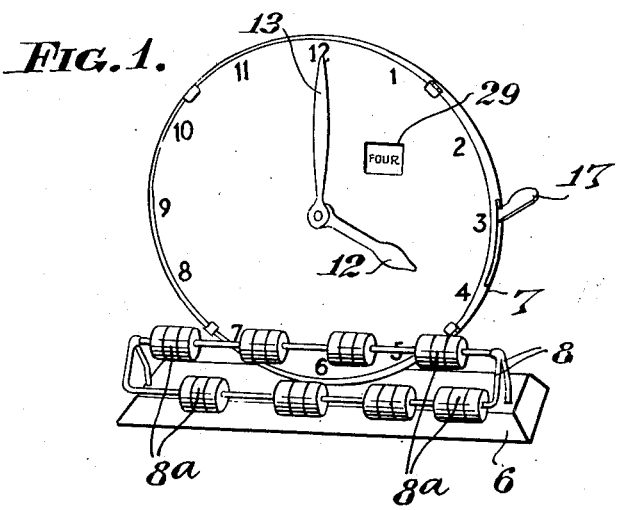
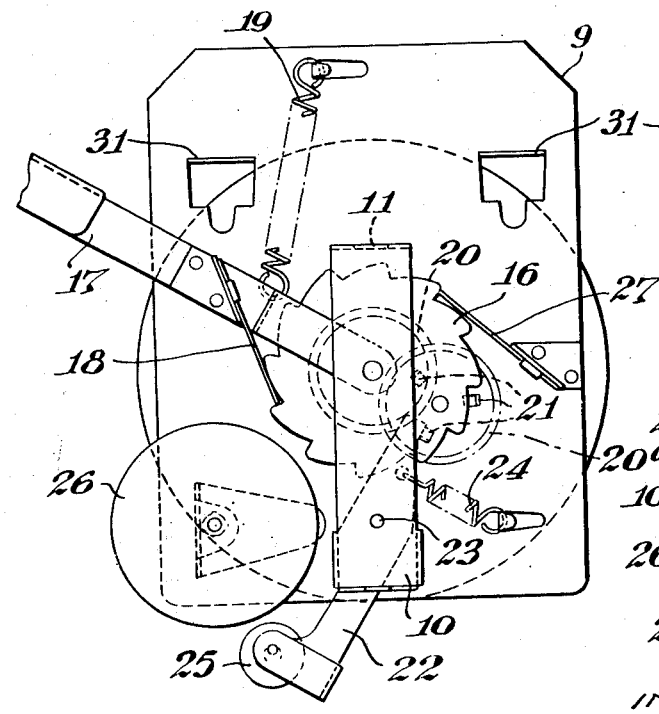
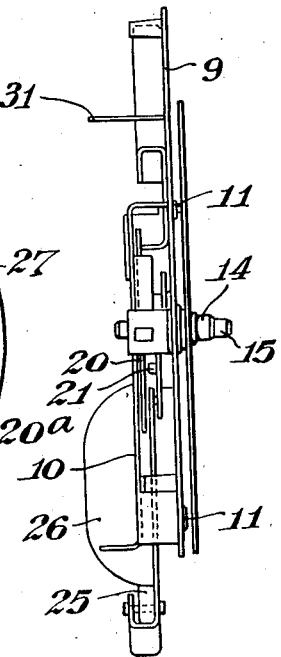
INVENTOR
JOHN B. LOBB
By [signature] Atty.

Jan. 23, 1951    J. B. LOBB    2,539,025
CHILD'S INSTRUCTIONAL OR AMUSEMENT DEVICE
Filed Aug. 1, 1947    2 Sheets-Sheet 2
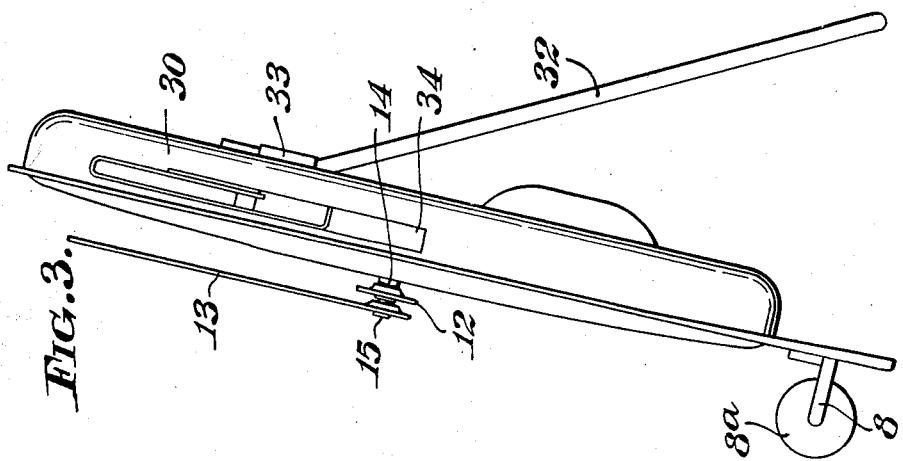
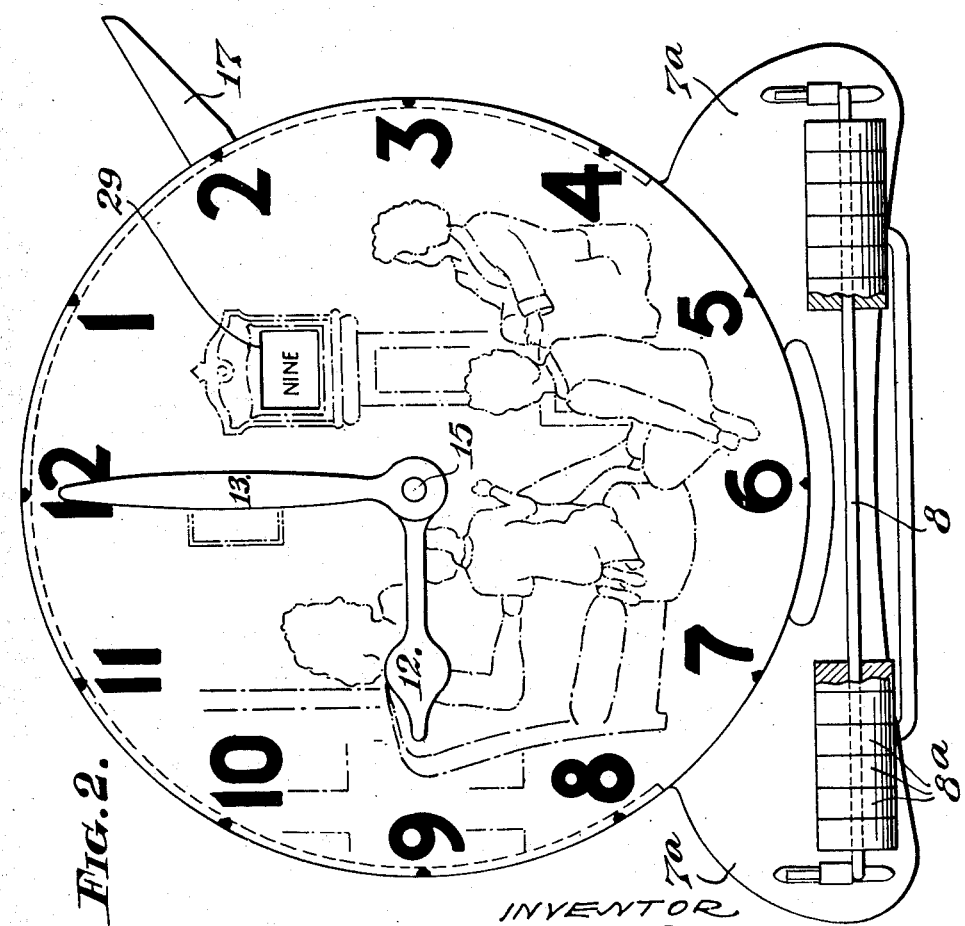
INVENTOR
JOHN B. LOBB
By Emory R. Groff Atty.

Patented Jan. 23, 1951

2,539,025

UNITED STATES PATENT OFFICE 2,539,025

CHILD'S INSTRUCTIONAL OR AMUSEMENT DEVICE

John Buchanan Lobb, Southgate, London, England

Application August 1, 1947, Serial No. 765,491
In Great Britain February 11, 1946

Section 1, Public Law 690, August 8, 1946
Patent expires February 11, 1966

1 Claim. (Cl. 35—39)

This invention relates to a child's instructional or amusement device of the kind including a clock face, which can be set by hand, thus teaching a child how to tell the time.

The primary object of this invention is to provide a device of improved construction wherein the hand movement is obtained mechanically by means of a hand actuated lever or similar device, the minute hand being arranged to move in step-by-step fashion conveniently in five minute steps.

According to this invention, the device comprises a clock face with hour and minute hands carried by spindles, a gear train behind the clock face and coupled to the spindles with an actuating member conveniently situated for hand actuation and coupled to the gear train by step-by-step driving mechanism whereby the hands will move in step-by-step fashion and at appropriate relative speeds around the face upon the actuation of the member.

The actuating member conveniently moves the hands one five minute step for each movement, that is to say, the minute hand moves through 30°, whilst the hour hand moves through one twelfth of this amount.

Also the invention may be said to comprise an instructional or amusement device consisting of a plate having a clock face thereon, supporting means for said plate, and a movement carrying hour and minute hand arbors, which movement is mounted on the rear of the clock face and includes a gear train to couple the hour and minute arbors in correct ratio, a step-by-step drive mechanism with a manual actuating lever, the one end of which projects from the edge of the face, whilst the other end is coupled to the drive mechanism, the arrangement being such that for each actuation of the lever the hands move one five minute step.

Alternatively, a suitable spring mechanism may be provided whereby the one movement of the actuating means results in the hands moving through one hour, in five minute steps.

In order that a clear understanding of the invention may be obtained, reference will now be made to the accompanying drawings, illustrating two preferred arrangements of the invention, and one preferred actuating mechanism, wherein;

Figure 1 is a front perspective view of one form of toy clock constructed in accordance with the invention;

Figure 2 is a front view of a modified construction;

Figure 3 is a side view thereof;

Figure 4 is a rear view of the actuating mechanism, and

Figure 5 is a side view thereof.

In the drawings, like reference numerals indicate like parts, and in Fig. 1, the device consists of a rectangular base 6 of pressed metal and a circular dial carrying plate 7 is mounted to upstand from the base. The base carries a wire frame 8, on which are a number of counters 8a. The mechanism is identical in both of the constructions illustrated and as shown in particular in Figs. 4 and 5, the said mechanism is carried by a front plate member 9, and a rear plate member 10, mounted in spaced parallel relation to the plate 9 by bending the ends to form lugs 11, 11, so that a cage like structure to house the mechanism is provided. The hour and minute hands numbered 12, 13 respectively, are carried by their arbors 14, 15, and the minute arbor 15 carries a ratchet like wheel 16 and a lever 17 freely pivoted on the spindle 15 carries a blade 18 adapted to co-operate with the wheel teeth, the said lever being loaded by the spring 19. The free end of the said lever projects from the cage structure, and when said structure is secured to the rear of the plate member 7, the said end projects beyond said plate 7 as shown in Figs. 1 and 2. The step down drive from the minute hand spindle to the hour hand spindle is provided by a gear train designated generally 20, whilst the wheel 20a of the said train has three projections 21 from its rear surface as shown. A second lever 22 is pivoted at 23 and is controlled by spring 24, the arrangement being such that on the turning of the wheel 20a in a clockwise direction Fig. 4, a projection 21 will co-operate with the end of the said arm, move same about its pivot to load the spring 24 until the projection clears the arm end, when the arm is returned by the spring, the roller 25 striking the bell 26. The disposition and arrangement is such that for every depression of the lever 17, the minute hand is moved five minutes and the hour hand proportionately through the gear train 20. The bell 26 is struck every time the hour is indicated. To prevent any back movement of the ratchet wheel 16, a spring blade 27 is provided suitably mounted on the plate member 9.

The mechanism is mounted on the rear of the plate 7, and a circular disc 28 is carried by the hour arbor, the arrangement being that a portion thereof is visible in a window 29 in the plate 7. This disc carries the hour numbers and moves with the hour hand so that upon the striking of the bell 26 by the roller 25, the correct hour is indicated in the window.

In the form illustrated in Fig. 1, the clock is self-supporting on its base. In the alternative form, the plate 7 carries a downwardly extending wing part 7a which carries the wire frame 8 and counters 8a. A cover 30 is arranged to fit over the mechanism, suitable turn over lugs and slots being provided to mount the said cover on the plate 7 and also to mount the mechanism within the cover. Thus, stamped out lugs 31 on the mechanism frame act as spacing and securing members and each semi-circular end part is arranged to pass through a slot in the cover and be bent over. A strut member 32 is bent at its one end so that this bent end can engage in a loop member 33 projecting from the cover. The slot 34 limits the movement of the actuating lever.

It will be understood that any suitable mechanism may be provided to impart the step-by-step hand movement. For example, a pin and Maltese cross mechanism may be provided, or a spring drive may be incorporated, arranged so that for one movement of the hand lever, the minute hand makes its twelve steps. For instance, an arcuate toothed rack may be provided which drives a gear train, the final wheel having a pin to engage a Maltese cross in the form of a wheel or disc having 12 equispaced notches in its circumference arranged so that upon each rotation of the aforesaid final wheel, the cross wheel is moved through 30°.

The arcuate toothed rack is pivotally mounted and extending from said pivot is a hand actuating lever, integral with the rack. A tension spring biasses the arcuate rack and on the hand depression of the lever the tension spring is loaded so that upon release of said lever the arcuate rack moves about its pivot, the arrangement of the gear train being such that the minute hand moves in 12 steps whereby the hands move in step-by-step fashion through the space of one hour. Thus upon each depression of the lever and subsequent release, the clock travels in 5 minute steps through one hour. A suitable free wheel device may be incorporated in the gear train to render same operative only upon the return movement by the spring.

I claim:

In a child's instructional and amusement device, the combination comprising, a dial having a window, an hour hand and a minute hand connected together by a gear train in the usual manner and sweeping over the dial, manually operated means to move the hands in five-minute steps, means movable with the hour hand and carrying hour indicating numbers each visible through the window at the completion of a full turn of the hour hand, audible signaling means mounted on the dial, three projections projecting from a wheel being part of the gear train and each at the completion of a full turn of the hour hand operating the signaling means, and counters movably connected to the dial and operable by the child.

JOHN BUCHANAN LOBB.

REFERENCES CITED

The following references are of record in the file of this patent:

UNITED STATES PATENTS

| Number | Name | Date |
|---|---|---|
| 440,374 | Smith | Nov. 11, 1890 |
| 488,521 | Hudson | Dec. 20, 1892 |
| 588,670 | Waters | Aug. 24, 1897 |
| 623,558 | Patterson | Apr. 25, 1899 |
| 1,143,519 | Edminston | June 15, 1915 |

FOREIGN PATENTS

| Number | Country | Date |
|---|---|---|
| 17,281 | Great Britain | 1915 |
| 27,861 | Australia | Aug. 13, 1931 |